INVENTOR
Harry H. Semmes
BY
W. E. Currie
ATTORNEY

Patented Dec. 19, 1933

1,940,653

UNITED STATES PATENT OFFICE 1,940,653

OBTAINING VALUABLE HYDROCARBON OILS FROM HEAVIER UNREFINED PRODUCTS BY THE ACTION OF HIGH PRESSURE HYDROGEN

Harry H. Semmes, Washington, D. C., assignor to Standard-I. G. Company

Application January 30, 1930. Serial No. 424,615

3 Claims. (Cl. 196—53)

The present invention relates to an improved process for obtaining valuable refined hydrocarbon oils from heavier hydrocarbons and to an apparatus for carrying out this process. More specifically my invention comprises an improved method for obtaining refined hydrocarbons from unrefined hydrocarbon materials by the action of high pressure hydrogen and an improved apparatus for carrying out the process. My invention will be fully understood from the following drawing which illustrates one form of apparatus constructed according to the invention.

Figure 1:
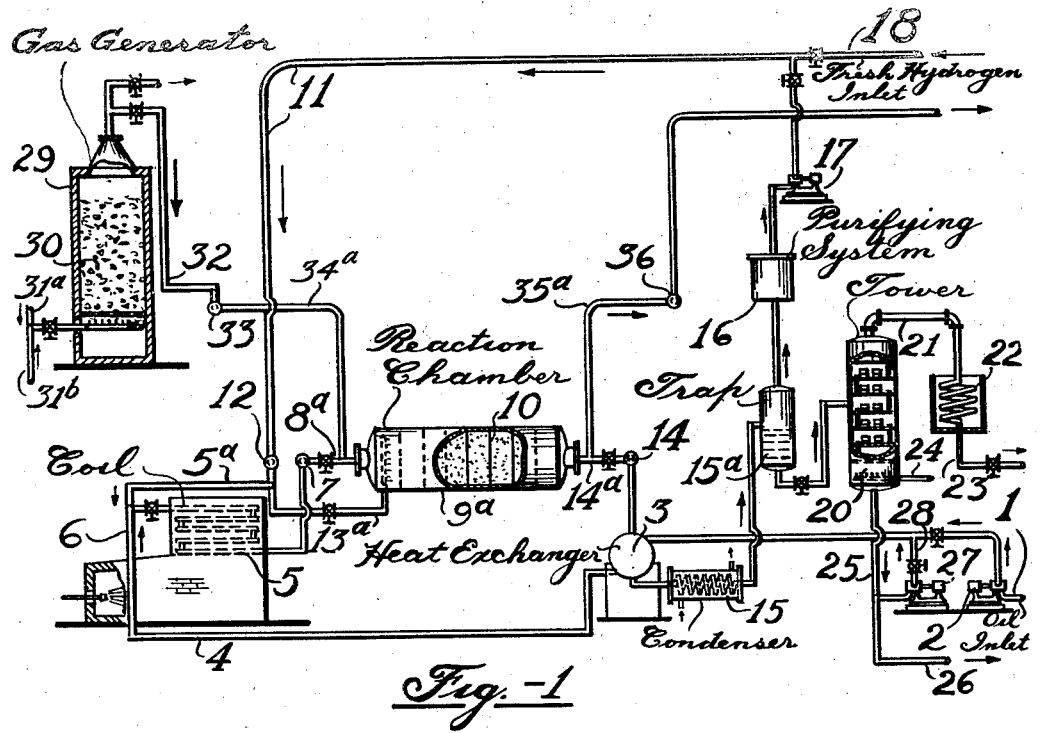
Figure 2:
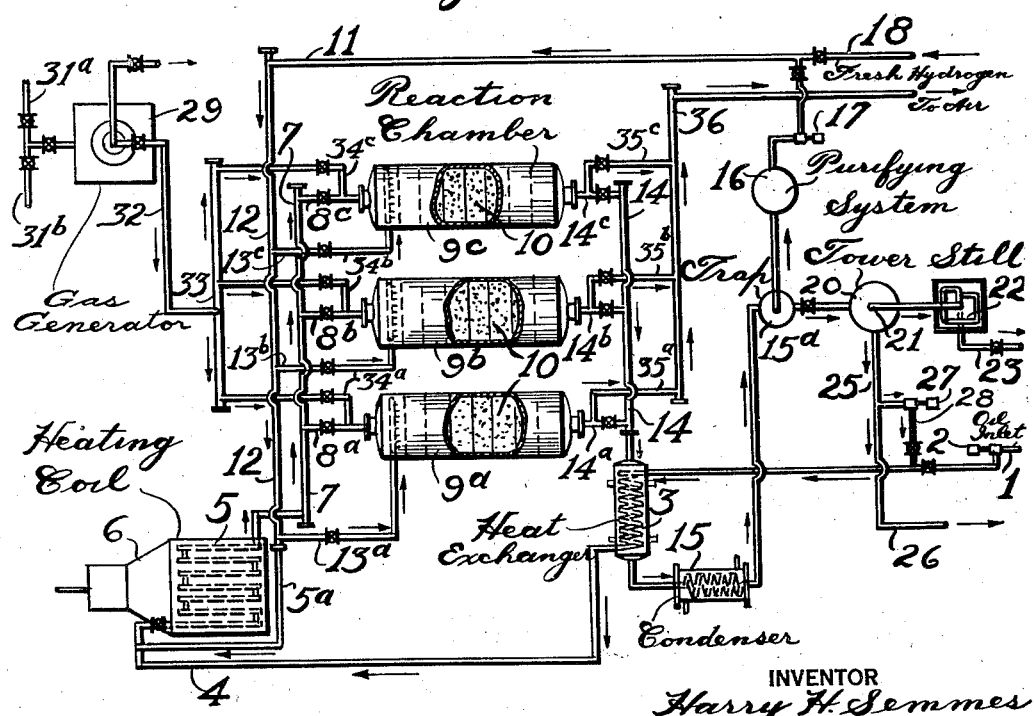

Fig. 1 of the drawing is a diagrammatic sketch in elevation of an apparatus constructed according to my invention and indicates the flow of the various materials thru the process and Fig. 2 is a plan view of the same apparatus.

Referring to the drawing reference numeral 1 indicates a pipe line thru which oil is forced from any convenient source, not shown, by a high pressure pump 2. The oil is first passed thru a heat exchanger 3 and thence by line 4 into and thru a heating coil 5 which is arranged in a fired setting 6 of suitable design. The heated oil then passes into a manifold 7 from which it may be directed thru any one or more of a series of reaction chambers of which only three are shown 9a—9b and 9c. The reaction chambers are connected to the manifold 7 by valve pipes 8a—8b and 8c respectively. High pressure hydrogen is supplied by a line 11 and a manifold 12 from which hydrogen may be added to the heating coil 5 by a branch pipe 5a and/or to each of the separate reactors 9a—9b and 9c respectively by lines 13a—13b and 13c. The reaction chambers are preferably adapted to withstand high pressures and in the neighborhood of 3,000 pounds per square inch or more, as well as temperatures in excess of 900° F. They are also packed with a suitable catalytic material, indicated by the numeral 10, the nature of which will be fully disclosed below. The material from the reactors is discharged by lines 14a—14b and 14c into a discharge manifold 14 and thence thru exchanger 3, condenser 15 and into trap 15a. Uncondensed gas is withdrawn from the upper portion of the trap and is passed thru a purifying system 16 which may consist of an oil scrubbing tower operated at high pressure and adapted to remove substantially all hydrogen sulfide and hydrocarbon constituents from the gas which is then recompressed by booster 17 and returned to line 11. Fresh hydrogen may be added under high pressure by means of line 18. Liquid oil withdrawn from the lower part of the trap 15a is then conducted into a tower still 20 which may be fitted with fractionation means, as will be understood. Light vapor is withdrawn from the top by a vapor line 21 condensed in a condenser 22 and run to storage by line 23. The still may be heated by steam injected thru pipe 24 or any other convenient method and the heavy oil is removed by line 25. It may be withdrawn to storage by line 26, or if desired may be returned to line 1 for recirculation by means of a pump 27 and line 28. Numeral 29 indicates generally a suitable means for generating a purifying gas, as will be disclosed below and may consist of a water gas generator. Numeral 30 indicates coke or similar material which is charged to the generator by any known means, not shown, and air and steam may be supplied either intermittently or continuously, as will be understood, thru lines 31a and 31b. Effluent gas which comprises water gas flows by line 32 to a manifold 33 from which it may be passed into and thru any one of the reactors 9a—9b and 9c by valve lines 34a—34b and 34c. After flowing thru either of the reactor chambers this gas is discharged by lines 35a—35b and 35c and is collected in a manifold 36 which discharges to the air.

It is well known in the art that ordinary hydrogenation catalysts are very sensitive to sulphur and other catalyst poisons, which occur to a large extent in all petroleum products. For this reason it has been very difficult to hydrogenate crude oil or any cuts therefrom, since the catalytic material rapidly loses its activity. Sulphur immune catalysts have been disclosed for this purpose, but such catalysts are generally costly and to my knowledge are not so active as the ordinary catalysts which are poisoned by sulphur. I have discovered methods by which it is feasible to secure the high activity of the ordinary catalyst such as nickel, cobalt and iron or their oxides for the hydrogenation or destructive hydrogenation of petroleum products, in spite of the fact that they are readily poisoned by sulphur, due to the formation of inactive metal sulfides.

In the operation of my process suitable catalytic material, such as nickel, cobalt or iron, or equivalent materials, readily poisonable by sulphur, are charged into the reaction chambers 9a—9b and 9c and the oil is then forced with the hydrogen thru the heating coil wherein it is heated to a temperature in excess of about 700° F. and thence into one or more of the reaction chambers. It is desirable to use the chambers in rotation, one at least being regenerated while the others are in use. The oil flows thru the catalyst mass gradually causing the same to be poisoned and thus rendered inactive, and after flowing thru the mass is collected and cooled. When the material has become relatively inactive the oil flow is diverted thru another of the reaction chambers by suitable manipulation of valves and the reaction chamber which had been in use is blocked from the high pressure system. A regenerating gas such as water gas or a gas rich in oxygen such as air, is then forced thru the spent catalytic material causing it to be regenerated in the form of the metal or metal oxide. The catalyst in the reaction zone will in general be at a sufficiently high temperature to allow the regeneration to start and the regenerating action being itself exothermic will then furnish the heat to maintain the regenerating temperature although additional heat may be supplied if necessary. In this manner one of the reaction chambers may be kept continually in operation and one may be regenerated simultaneously.

There are two general purposes for which my process is particularly applicable, first it may be used to produce high grade lubricating oils from lower grade materials, for example; oils similar in their viscosity-temperature characteristics to those produced from Pennsylvania and equivalent crudes, may be produced from lower grade crudes such as Texas, Coastal or Colombian crudes by the treatment with high pressure hydrogen. In such a process the temperature of the oil in the coil and reaction drum is preferably not over about 830° F. or 850° F. and the rate of flow is between about .2 and .8 volumes of oil per volume of reaction chamber per hour. The hydrogen pressure may be in excess of about 50 atmospheres, although it is preferable to have the pressure considerably higher, say 100 to 200 atmospheres, or even more and a large excess of hydrogen over that actually required to react with the oil is continually circulated, for example it should be over 3000 cubic feet of hydrogen per barrel of oil and about 10,000 is satisfactory. In this process the hydrocarbon oil, which is preferably a heavy distillate passes thru the reactor in liquid phase and is reduced in viscosity. A portion generally under about 20% is decomposed so as to boil at a temperature below about 400° F. This fraction is suitable for gasoline and the heavier fraction comprises gas oil, spindle and heavier lubricating oils. In this operation the heavy oil is reduced to the proper viscosity in the distillation tower 20 and is withdrawn by means of lines 25 and 26 to storage, not shown, and it is preferable not to recirculate the heavy oils thru line 28 back to feed line as indicated on the drawing.

The second important application of my process consists in the production of large quantities of low boiling hydrocarbons of the nature of gasoline or somewhat higher boiling materials. In this process the oil fed is preferably a distillate such as gas oil or kerosene which may be vaporized in the heating coil 5 and passes into substantially vaporized form through the reactors 9a—9b and 9c. In this case temperature is preferably higher than in the case where lubricating oils are desired from heavier products, for example; it is desirable to hold the temperatures above about 850° F. and preferably above about 930° F. are used. Pressure is in excess of about 20 atmospheres, but preferably higher pressures, say 100 or 200 atmospheres. The rate of flow of the oil is ordinarily in excess of one volume per hour per volume of reactor space and may be considerably higher, for example 1½ to 3 volumes per volume per hour. The volume of hydrogen is, as before, considerably in excess of that required to react with the oil and may be in excess of about 1,000 cubic feet per barrel of oil fed, although I generally prefer it to be above about 2,000 cubic feet. The oil produced by this process comprises a naphtha of high anti-detonation characteristics comparable to ordinary gasoline produced from sweet crude to which 20 or 30% of benzol has been added. Only a part of the oil is converted to low boiling products, boiling say below 400° F. and it is highly desirable to recirculate the heavier fractions boiling above this temperature. For this reason the heavier fractions obtained as a bottoms from tower still 20 are ordinarily recirculated by line 25 and 28 to the feed lines 1. In this manner yields of light oils of the gasoline range as high as 70 or 80% of the feed may be obtained.

It will be understood that various equivalent and alternative methods or combinations may be used in connection with my process, for example; two or more reaction chambers may be connected in series and if desired, especially with the relatively cheaper catalytic agents, the catalyst may be discharged when spent and discarded, or it may be regenerated and recharged as fresh catalyst. I prefer, however, to regenerate the catalyst in place by the means indicated above.

It will be understood that the present process is applicable to the refining of oils such as naphthas, kerosene and the like for production of purified oils of substantially the same boiling range, for example; low grade kerosene can be greatly improved in respect to sulphur content and burning qualities.

My invention is not to be limited by any theory of the mechanism of the reactions nor to any specific example which may have been given for purpose of illustration, but only by the following claims in which I wish to claim all novelty inherent in my invention.

I claim:

1. A continuous process for obtaining valuable refined hydrocarbons from unrefined sulfur-containing hydrocarbon oil which comprises subjecting the unrefined oil to the action of hydrogen under pressure in excess of 20 atmospheres and at temperatures above 700° F. in a reaction zone packed with a catalytic material which promotes the hydrogenation but is subject to sulfur poisoning comprising a substance selected from the group of nickel, cobalt, iron or their oxides, continuing the flow of oil through the reaction zone only until the catalytic material shows loss of hydrogenating activity, then diverting the flow of oil into a second reaction zone similar to the first and simultaneously regenerating the catalytic material in the first zone by roasting.

2. Process according to claim 1 in which the mixture having passed through the reaction zone is separated into normally gaseous products, portions boiling below about 400° F. and heavier portions, and such heavier portions are recirculated through a heating coil to the catalytic zone.

3. A continuous process for obtaining valuable low boiling hydrocarbon oils from higher boiling sulfur-containing hydrocarbon oil which comprises passing the higher boiling hydrocarbon oil under pressure of hydrogen in excess of 20 atmospheres and at temperature between 850 and 930° F. alternately through each of a series of reaction zones containing a fixed catalytic material which promotes hydrogenation but is subject to sulfur poisoning comprising a substance from the group of nickel, cobalt iron or their oxides, continuing the flow of oil and hydrogen through each zone only until the catalyst therein is largely poisoned, then diverting the flow to another zone, simultaneously regenerating the catalytic material in the previously used zone by roasting cooling the product from each zone, separating therefrom the fractions boiling substantially in the gasoline range, and returning the heavier fractions for further treatment.

HARRY H. SEMMES.